(12) United States Patent
Fuse (10) Patent No.: US 9,001,359 B2
(45) Date of Patent: Apr. 7, 2015

(54) INFORMATION PROCESSING APPARATUS CAPABLE OF SETTING CONFIGURATION INFORMATION FOR USE BY AN IMAGE PROCESSING APPARATUS, AND CONTROL METHOD AND STORAGE MEDIUM THEREFOR

(75) Inventor: Hiroshi Fuse, Kawasaki (JP)

(73) Assignee: Canon Kabushiki Kaisha (JP)

( * ) Notice: Subject to any disclaimer, the term of this patent is extended or adjusted under 35 U.S.C. 154(b) by 292 days.

(21) Appl. No.: 13/326,488

(22) Filed: Dec. 15, 2011

(65) Prior Publication Data

US 2012/0154863 A1    Jun. 21, 2012

(30) Foreign Application Priority Data

Dec. 15, 2010    (JP) .................................. 2010-279278

(51) Int. Cl.
*G06F 3/12*    (2006.01)
*H04N 1/00*    (2006.01)

(52) U.S. Cl.
CPC ....... *H04N 1/00222* (2013.01); *H04N 1/00416* (2013.01); *H04N 2201/3207* (2013.01); *H04N 2201/3218* (2013.01); *H04N 2201/3204* (2013.01); *H04N 2201/3214* (2013.01); *H04N 2201/3219* (2013.01); *H04N 2201/3216* (2013.01)

(58) Field of Classification Search
None
See application file for complete search history.

(56) References Cited

U.S. PATENT DOCUMENTS

| | | | |
|---|---|---|---|
| 7,242,498 B2 * | 7/2007 | Fujiwara | 358/1.16 |
| 2006/0221407 A1 | 10/2006 | Uchida et al. | |
| 2006/0265263 A1 * | 11/2006 | Burns | 705/8 |
| 2007/0183448 A1 * | 8/2007 | Ochiai | 370/463 |

FOREIGN PATENT DOCUMENTS

| | | | |
|---|---|---|---|
| JP | 2001-028655 A | 1/2001 | |
| JP | 2006-287389 A | 10/2006 | |
| JP | 2007-214654 A | 8/2007 | |

OTHER PUBLICATIONS

Office Action dated Jul. 29, 2014, issued in corresponding Japanese Patent Application No. 2010279278.

* cited by examiner

*Primary Examiner* — Paul F Payer
(74) *Attorney, Agent, or Firm* — Rossi, Kimms & McDowell LLP

(57) ABSTRACT

An information processing apparatus capable of easily registering and deleting configuration information and providing excellent user-friendliness. An integrated application that operates on the information processing apparatus capable of communicating with an image processing apparatus through a network sets configuration information for use by the image processing apparatus for data transmission, and instructs the image processing apparatus to display an icon corresponding to the configuration information on a touch panel of the image processing apparatus. When one of icons displayed on the touch panel is touched, data is transmitted from the image processing apparatus to a transmission destination represented by the confirmation information corresponding to the icon. If the data is successfully received by the transmission destination, the integrated application instructs the image processing apparatus to delete the configuration information corresponding to the touched icon.

12 Claims, 9 Drawing Sheets

| DELETION CONDITION SETTING | ✕ |
|---|---|
| AUTO-DELETE | ■ — 701 |
| DELETE CONFIRMATION | ☐ — 702 |
| EXPIRATION DATE | 2010/08/01 — 703 |

OK (704)  RETURN (705)

CONFIGURATION INFORMATION DELETE CONFIRMATION  ✕

DO YOU WISH TO DELETE USED CONFIGURATION INFORMATION?

YES (801)  NO (802)

| REGIS-TRATION NUMBER | ICON NAME | DEVICE | TRANSFER FOLDER | STORAGE FOLDER | IP | ID | PASS-WORD | COLOR | AUTO-DELETE | DELETION CONFIR-MATION | EXPI-RATION DATE |
|---|---|---|---|---|---|---|---|---|---|---|---|
| 1 | A | 100.100.100.100 | c:¥temp¥a | c:¥data¥a | 192.168.22.33 | guest | 1111 | COLOR | ON | ON | 2010/10/11 |
| 2 | B | 100.100.100.101 | c:¥temp¥b | c:¥data¥b | 192.168.22.44 | test | 2222 | MONO-CHROME | ON | OFF | 2010/11/12 |
| 3 | C | 100.100.100.102 | c:¥temp¥c | c:¥data¥c | 192.168.22.55 | admin | 3333 | COLOR | OFF | - | - |
| ...... | | | | | | | | | | | |

INFORMATION PROCESSING APPARATUS CAPABLE OF SETTING CONFIGURATION INFORMATION FOR USE BY AN IMAGE PROCESSING APPARATUS, AND CONTROL METHOD AND STORAGE MEDIUM THEREFOR

BACKGROUND OF THE INVENTION

1. Field of the Invention

The present invention relates to an information processing apparatus capable of setting configuration information for use by an image processing apparatus for data transmission, and relates to a control method and a storage medium therefor.

2. Description of the Related Art

In recent years, office equipment such as multi-function peripherals and facsimile machines have been used to improve the efficiency of business activities. For example, pieces of configuration information can be registered into office equipment, and in accordance with a user's instruction, the registered pieces of configuration information can be displayed on an operation panel of the office equipment. In the case, for example, of document transmission, a user can select configuration information about a transmission destination from among the registered pieces of configuration information displayed on the operation panel, whereby easy document transmission can be ensured.

However, in a case where many pieces of configuration information are set to the same office equipment by many users, the total number of pieces of configuration information increases to an extent that these configuration information cannot simultaneously be displayed on the operation panel. Accordingly, the pieces of configuration information are scroll-displayed on the operation panel, but it becomes more difficult for each individual user to find the desired configuration information with increase of amount of configuration information, so that user-friendliness is lowered.

To obviate this, there has been proposed office equipment (data processing apparatus) configured to register configuration information (identification information) in response to a request from an information processing apparatus such as a computer, and configured to automatically delete configuration information according to the status of use of or the expiration date of the configuration information (see, for example, Japanese Laid-open Patent Publication No. 2007-214654).

With the proposed office equipment, configuration information stored therein for use in data transmission is automatically deleted when data has normally been transmitted from the office equipment to a transmission destination apparatus, even if the data cannot normally be received by the transmission destination apparatus.

Accordingly, at the time of data retransmission and at the time of next data transmission, a user cannot again use the configuration information and is required to again set the configuration information, which poses inconvenience.

SUMMARY OF THE INVENTION

The present invention provides an information processing apparatus capable of easily registering and deleting configuration information and providing excellent user-friendliness, and provides a control method and a storage medium therefor.

According to one aspect of this invention, there is provided an information processing apparatus capable of communicating with an image processing apparatus through a network, which comprises a setting unit configured to set configuration information for use by the image processing apparatus for data transmission, a display instructing unit configured to instruct the image processing apparatus to display on a display unit of the image processing apparatus at least one mark corresponding to at least one piece of configuration information set by the setting unit, and a deletion instructing unit configured to instruct the image processing apparatus to delete the configuration information corresponding to one selected from the at least one mark displayed on the display unit on condition that data transmitted from the image processing apparatus to a transmission destination that is indicated by the configuration information corresponding to the selected mark is successfully received by the transmission destination.

With this invention, since configuration information is deleted while user's intention is taken into account, it becomes easy for a user to register and delete configuration information, and user-friendliness can be improved.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
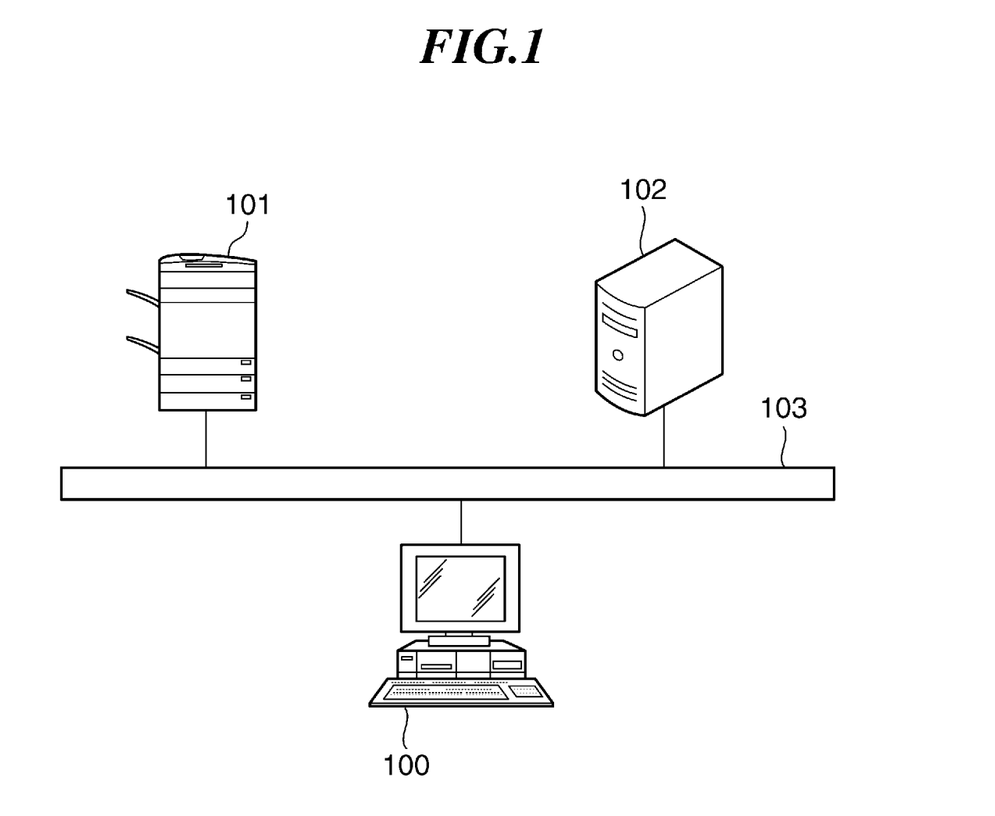
FIG. 1 is a schematic view showing an example of a data processing system that includes an information processing apparatus according to one embodiment of this invention.

FIG. 1 schematically shows an example of a data processing system that includes an information processing apparatus according to one embodiment of this invention.

As shown in FIG. 1, the data processing system includes an information processing apparatus 100, an image processing apparatus 101, and an information storage apparatus 102, which are connected with one another through a network, e.g., a LAN (local area network) 103. The information processing apparatus 100 is capable of communicating with the image processing apparatus 101 through the LAN 103. It should be noted that the information processing apparatus 100, the image processing apparatus 101, and the information storage apparatus 102 are each one in number in the illustrated example, but may be plural in number.

The image processing apparatus 101 is implemented by, e.g., a multi-function peripheral (MFP) having a file transmission function, copy function, scanner function, printer function, fax function, etc.

The information processing apparatus 100 is implemented by a computer or the like and used by a user to instruct the image processing apparatus 101 to transmit information (hereinafter, also referred to as data or file).

The information processing apparatus 100 is installed with an operating system (OS) and installed with various applications for performing various processing such as document processing, spreadsheet processing, presentation processing, image processing, and graphic processing. These applications have independent data structures (file structures). The OS is capable of discriminating identifiers from one another, each of which represents the corresponding file structure, and is capable of giving a printing instruction to the application corresponding to the discriminated identifier.

The information processing apparatus 100 is also installed with an integrated application that integrates and manages various functions on the desk top of the information processing apparatus 100. The integrated application has functions of managing information, reducing printing costs, improving fax operations, improving computerized paper work, performing electronic document-based approval operations, and sharing in-company information.

The information storage apparatus 102 has a function of receiving data transmitted from the image processing apparatus 101 and a function of transmitting and receiving data to and from the information processing apparatus 100.

Figure 2:
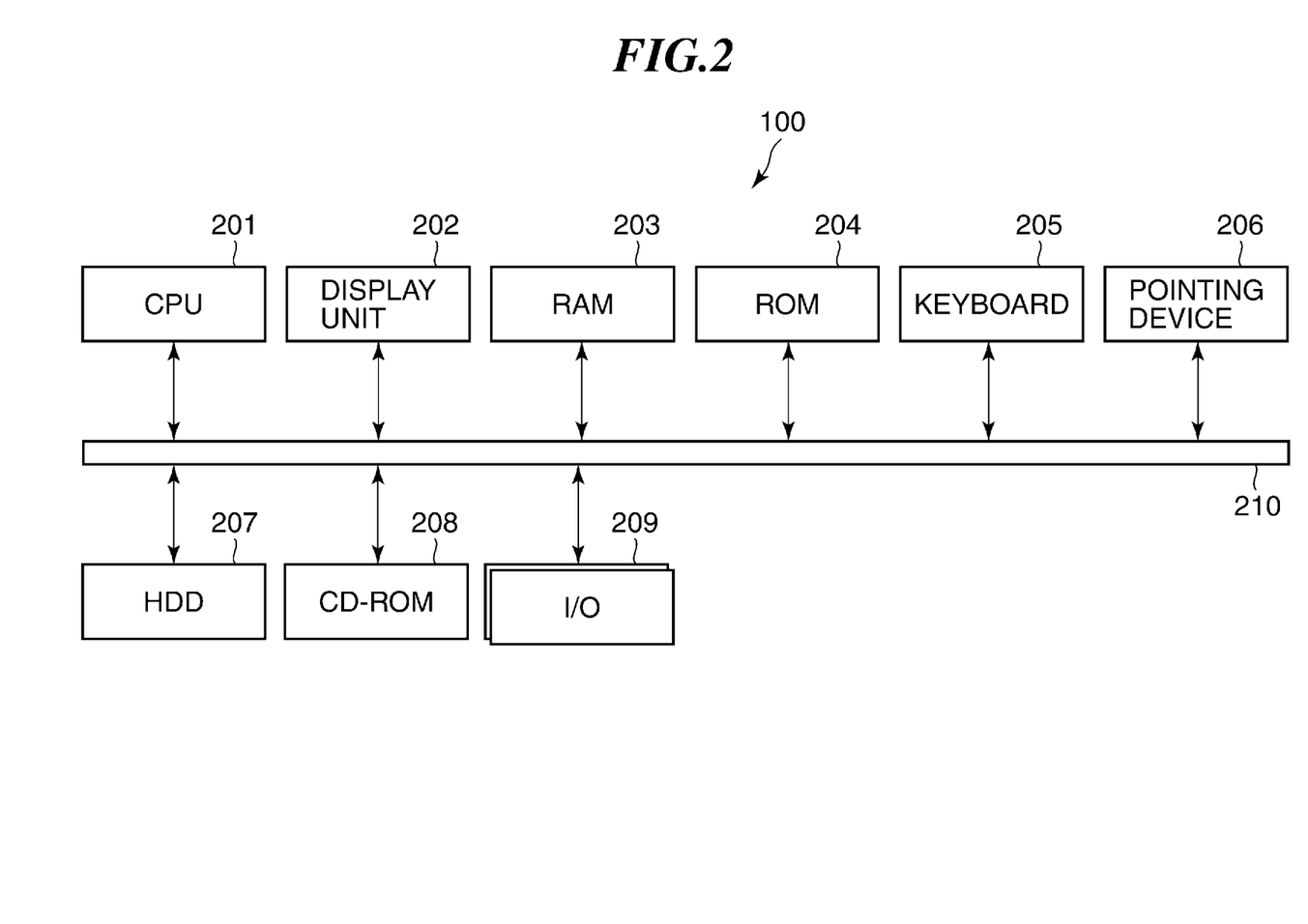
FIG. 2 is a block diagram showing a hardware structure of the information processing apparatus.

FIG. 2 shows in block diagram a hardware structure of the information processing apparatus 100.

As shown in FIG. 2, the information processing apparatus 100 includes a CPU 201, display unit 202, RAM 203, ROM 204, keyboard 205, pointing device 206, HDD 207, CD-ROM 208, and I/O (interface device) 209, which are connected to one another through an internal bus 210.

The keyboard 205 and the pointing device 206 are input devices that receive a user's operation input. The display unit 202 visually displays various information. The RAM 203, HDD 207, ROM 204, and CD-ROM 208 are storage devices for storing various programs to be executed by the CPU 201 and information generated by program execution. The I/O 209 is an interface for wired or wireless connection between the information processing apparatus 100 and external equipment (not shown) or the image processing apparatus 101.

Figure 3:
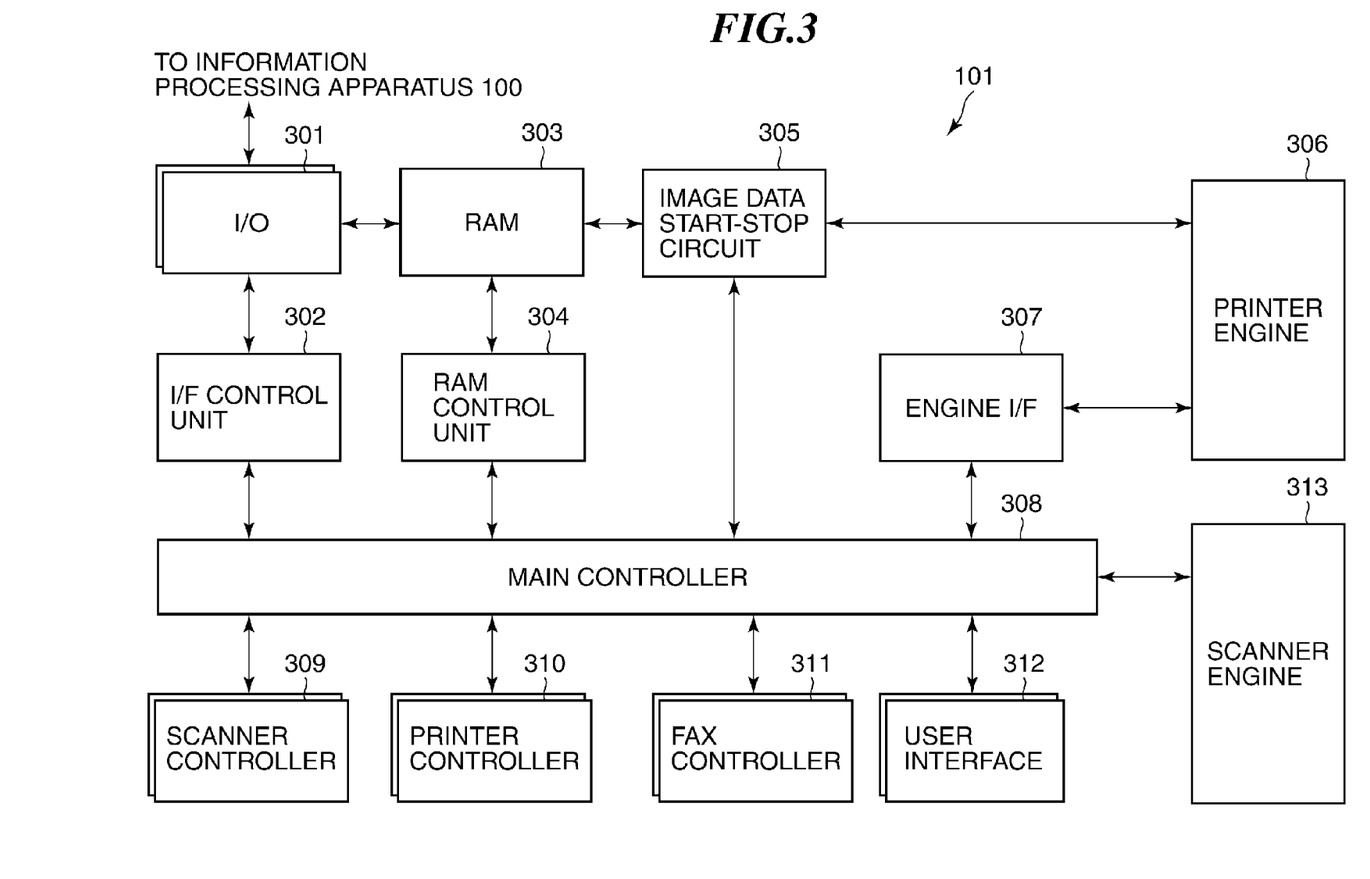
FIG. 3 is a block diagram showing a hardware structure of an image processing apparatus shown in FIG. 1.

FIG. 3 shows in block diagram a hardware structure of the image processing apparatus 101. As previously described, the image processing apparatus 101 is implemented by, e.g., an MFP that at least has a scanner function, printer function, and fax function.

As shown in FIG. 3, the image processing apparatus 101 includes an I/O (interface) 301, which is connected through the LAN 103 to the information processing apparatus 100 and to the information storage apparatus 102. The I/O 301 can include both an I/O for wired connection and an I/O for wireless connection.

The image processing apparatus 101 transmits device IDs and scan images through the I/O 301 to the information processing apparatus 100 or to the information storage apparatus 102, receives control commands from the information processing apparatus 100 through the I/O 301, and executes processes according to the control commands.

The image processing apparatus 101 includes an I/F control unit 302 that controls issuance of device IDs to image processing systems such as a scanner, printer, and fax, which are mounted on the image processing apparatus 101.

A RAM 303 is a primary storage unit in which external data such as control commands acquired through the I/O 301, scanner images read by a scanner engine 313, and images (image data) developed by a printer controller 310 for transmission to a printer engine 306 are stored. Allocation and management on the RAM 303 are performed by a RAM control unit 304.

In synchronous with operation of the printer engine 306, an image data start-stop circuit 305 outputs images read by the scanner engine 313 or outputs images developed by the printer controller 310 and stored into the RAM 303.

The printer engine 306 develops and outputs images on an output medium such as a sheet of paper. In other words, the printer engine 306 performs printing. A main controller 308 controls the printer engine 306 through an engine I/F 307. The main controller 308 also controls the entire image processing apparatus 101, such as assigning control commands received from the information processing apparatus 100 to a scanner controller 309, printer controller 310, and fax controller 311.

In accordance with an instruction received from any of the scanner controller 309, printer controller 310, fax controller 311, and user interface 312, the main controller 308 controls the printer engine 306 and/or the scanner engine 313.

By unifying control interfaces between the main controller 308 and the scanner controller 309, printer controller 310, and fax controller 311, it becomes possible to mount an expansion board capable of processing plural types of control commands on one peripheral unit. The main controller 308 acquires device IDs from the controllers 309 to 311 and manages these device IDs.

The scan controller 309 decomposes a scan control command received from the information processing apparatus 100 into internal execution instructions that can be interpreted by the main controller 308. Furthermore, the scan controller 309 changes an image read by the scanner engine 313 to a scan control command.

The printer controller 310 decomposes a page description language code received from the information processing apparatus 100 into internal execution instructions (including a developed image in page description language) that can be interpreted by the main controller 308. The developed image is sent to the printer engine 306 that prints the image onto an output medium such as a sheet.

The fax controller 311 develops a fax control language code received from the information processing apparatus 100 into an image, and transmits the image to a fax machine through a public telephone line or a network (e.g., the Internet).

The user interface 312 is used by a user to establish settings of the main controller 308 and to instruct the image processing apparatus 101 to execute the scanner function, printer function, or fax function.

The scanner engine 313 reads an image of an original or the like in accordance with an instruction supplied from the main controller 308, converts the read image into an electrical signal, and sends the electrical signal to the main controller 308.

Figure 4:
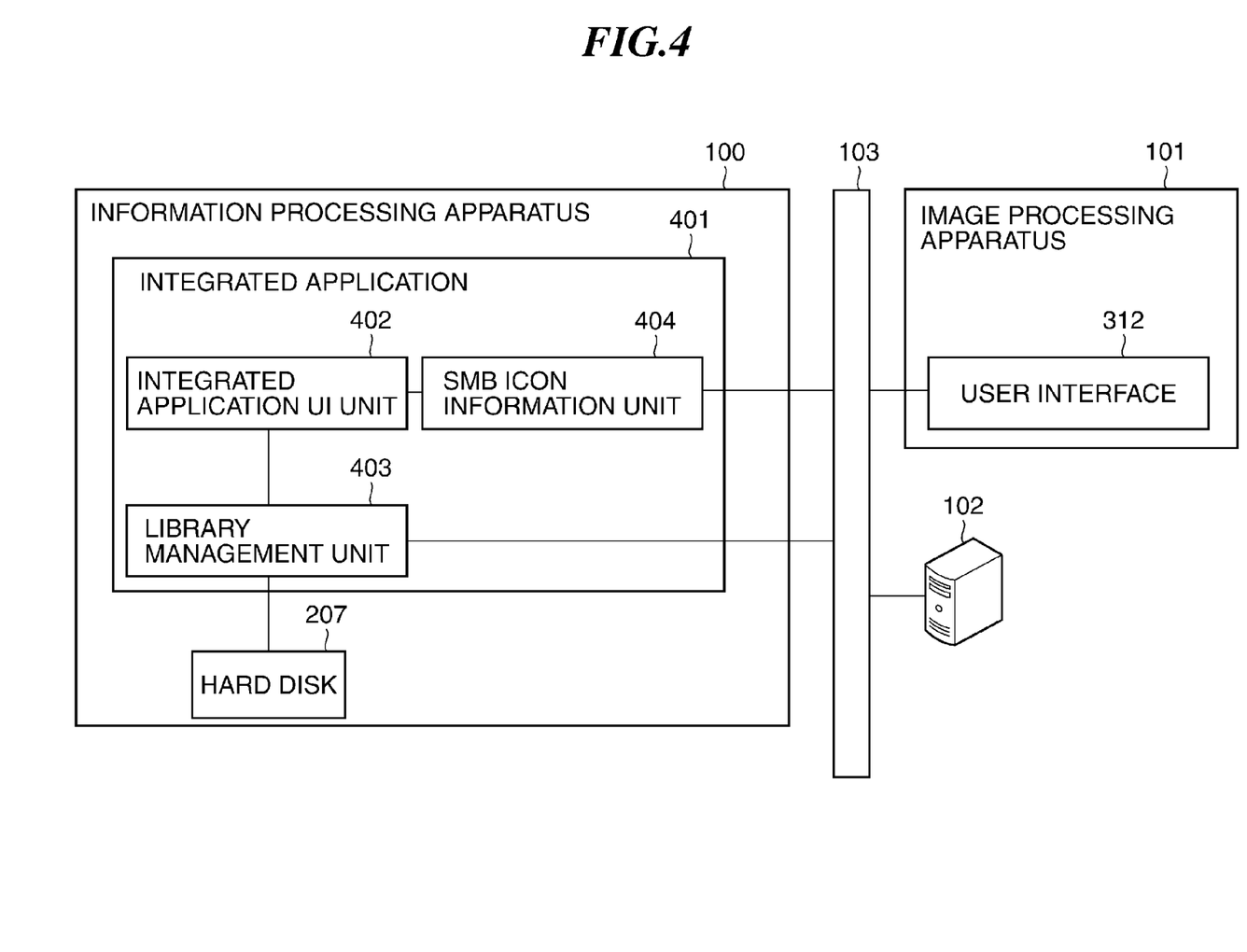
FIG. 4 is a block diagram showing a software structure of the information processing apparatus.
Figure 5:
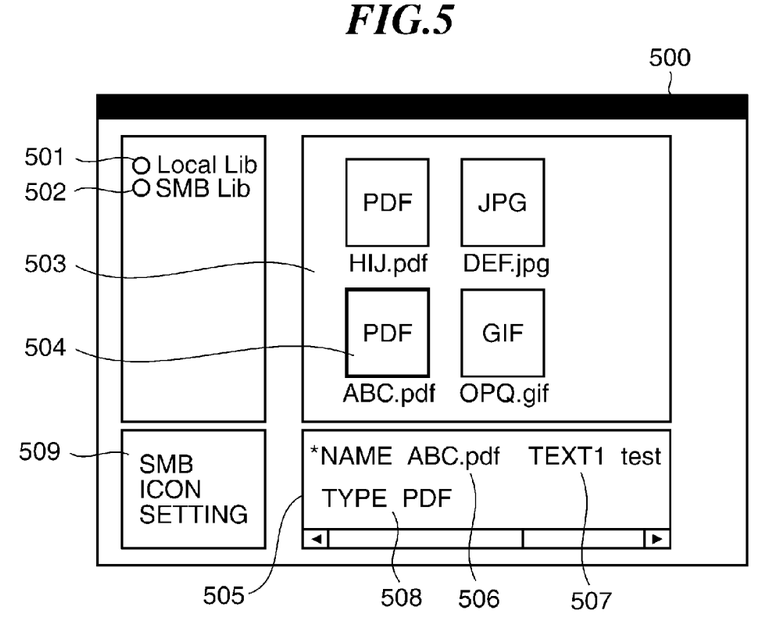
FIG. 5 is a view showing a user interface screen displayed on a display unit of the information processing apparatus by an integrated application that operates on a CPU of the information processing apparatus.

FIG. 4 is a block diagram showing a software structure of the information processing apparatus 100. FIG. 5 shows a user interface screen, which is displayed on the display unit 202 of the information processing apparatus 100 by an integrated application that operates on the CPU 201 of the information processing apparatus 100.

The integrated application (denoted by reference numeral 401 in FIG. 4) has user interfaces through which user's input operations on the desktop of the information processing apparatus 100 are accepted, and centrally manages various processing such as document processing, spreadsheet processing, presentation processing, image processing, and graphic processing.

The integrated application 401 includes an integrated application UI (user interface) unit 402, a library management unit 403, and an SMB (server message block) icon information unit 404.

The integrated application UI unit 402 displays a user interface screen (main window) 500 shown in FIG. 5 on the display unit 202 of the information processing apparatus 100.

The library management unit 403 accesses libraries and centrally processes file operations. These libraries are held in various storage areas. In the following, the term "local libraries" will refer to libraries that are held in a storage region of the hard disk 207. Each of the local libraries can be used only by a user who is utilizing the integrated application 401.

The term "SMB libraries" will refer to libraries that are held in the information storage apparatus 102. Each of the SMB libraries can be shared by users having an access right to the information storage apparatus 102 after being defined by these users by using the integrated application 401.

In FIG. 5, reference numeral 501 denotes a "Local Lib" icon (also referred to as the mark) that is displayed when a corresponding local library is registered, and 502 denotes an "SMB Lib" icon displayed when a corresponding SMB library is registered.

Reference numeral 503 denotes a file list pane in which there are displayed files or folders stored in a selected library. A selection frame 504 indicates which of the files or folders displayed in the file list pane 503 is being selected. In a property pane 505, the property of the selected file or folder indicated by the selection frame 504 is displayed. The property includes one or more items.

In the illustrated example, the property includes a "name" item 506 set with a value of ABC.pdf, a "text1" item 507 set with a value of test, and a "type" item 508 set with a value of PDF. The number of items that can be set in the property of each library is defined on a per library basis, and varies depending on the function of the library. In the property of each local library, items can be set which are the same as property items that can be set in the file system of the OS.

The library management unit 403 of the information processing apparatus 100 manages properties of various libraries, and sends information about property items and values thereof to the integrated application UI unit 402 in response to any of the properties being designated.

An SMB icon information unit 404 manages SMB icon settings. An SMB icon setting field 509 in the user interface screen 500 of FIG. 5 is used to set an SMB icon to be produced on a touch panel of the image processing apparatus 101.

Figure 6:
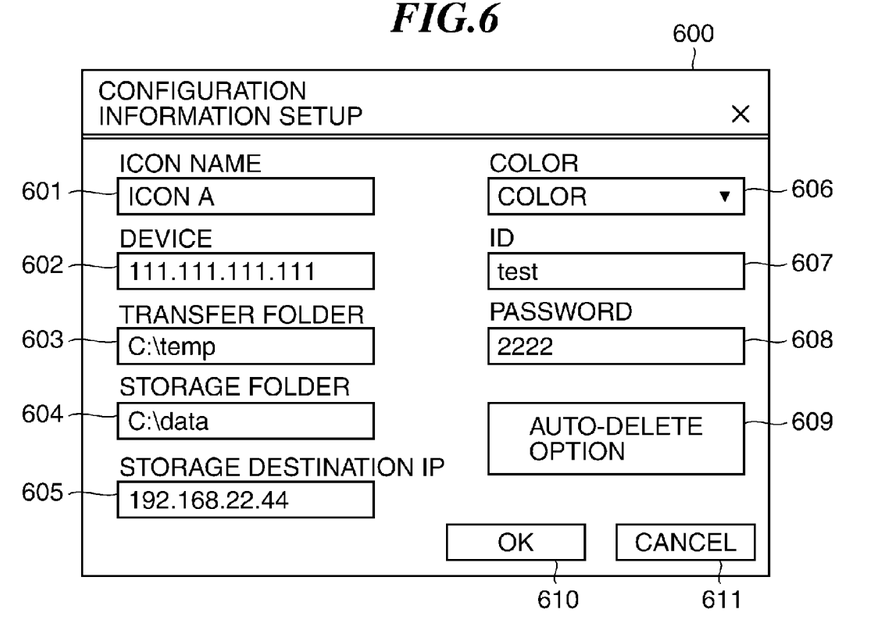
FIG. 6 is a view showing an example of a configuration information setup dialog displayed on the display unit of the information processing apparatus.

FIG. 6 shows an example of a configuration information setup dialog displayed on the display unit 202 of the information processing apparatus 100.

When the SMB icon setting field 509 of FIG. 5 is operated by the user, the integrated application UI unit 402 displays the configuration information setup dialog (denoted by reference numeral 600 in FIG. 6) on the display unit 202 of the information processing apparatus 100. On the configuration information setup dialog 600, the user is capable of setting configuration information necessary for data transmission/reception between the information processing apparatus 100 and the image processing apparatus 101.

In the configuration information setup dialog 600, there are displayed fields of icon name 601, device 602, transfer folder 603, storage folder 604, storage destination IP 605, color 606, ID 607, password 608, and auto-delete option 609, together with an OK button 610 and a cancel button 611.

The icon name field 601 is set with an icon name, which is to be displayed on the touch panel of the image processing apparatus 101. The device field 602 is set with an IP (host name) of the image processing apparatus 101, and the folder field 603 is set with a transfer folder for temporary storage of image data transmitted from the image processing apparatus 101. As the transfer folder, any of folders in the information processing apparatus 100 and folders on the network can be used. The ID field 607 is set with an ID to be used to access the transfer folder.

The password field 608 is set with a password to be used to access the transfer folder, the storage folder field 604 is set with a folder for storing image data temporarily stored in the transfer folder, the storage destination IP field 605 is set with an IP of the information processing apparatus in which the storage folder is present, and the color field 606 is set with color information (such as resolution and file format) of image data.

The auto-delete option 609 is used to set a condition for deletion of configuration information, as will be describe later.

When the OK button 610 is pressed after configuration information is set on the configuration information setup dialog 600, the SMB icon information unit 404 sends an icon including the configuration information to the image processing apparatus 101, and the icon including the configuration information is displayed on the touch panel of the image processing apparatus 101. When the cancel button 611 is pressed, the configuration information setting is canceled.

Figure 7:
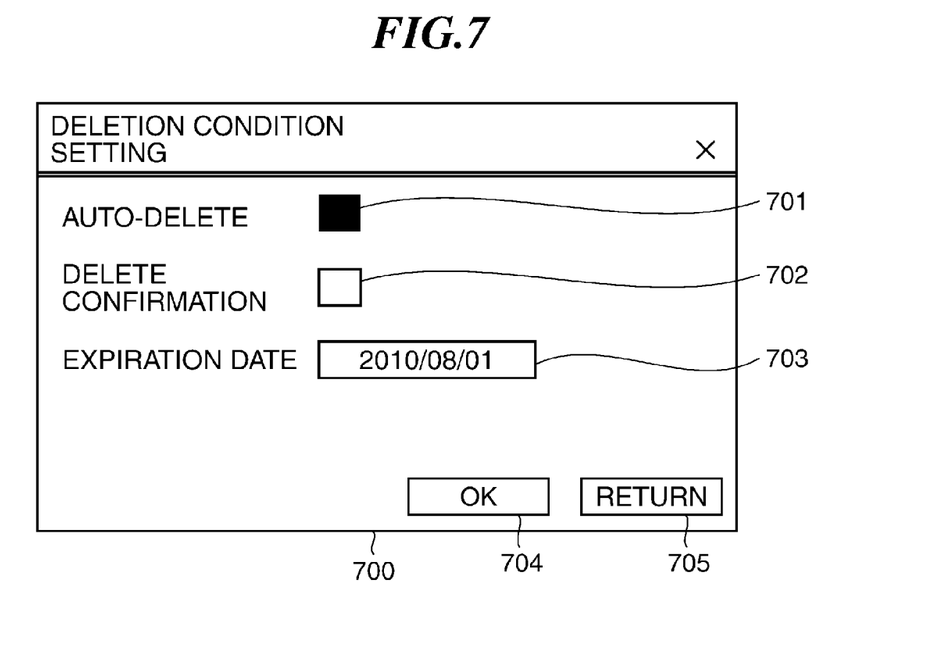
FIG. 7 is a view showing an example of a deletion condition setting dialog that is displayed in response to an auto-delete option being operated in the configuration information setup dialog.

FIG. 7 shows an example of a deletion condition setting dialog displayed in response to the auto-delete option 609 being operated in the configuration information setup dialog 600.

When the auto-delete option 609 is operated by the user, the integrated application UI unit 402 displays a deletion condition setup dialog (denoted by reference numeral 700 in FIG. 7) on the display unit 202 of the information processing apparatus 100.

On the deletion condition setup dialog 700, there are displayed an auto-delete box 701, delete confirmation box 702, expiration date field 703, OK button 704, and return button 705.

The auto-delete box 701 is a check box for setting whether configuration information is allowed to be automatically deleted. By checking (turning on) the auto-delete box 701, it becomes possible to allow the icon to be automatically deleted.

The delete confirmation box 702 and the expiration date field 703 are used to specify a property that allows the icon to be automatically deleted. If the auto-delete box 701 is checked, the delete confirmation box 702 (confirmation setting unit) and the expiration date field 703 are made enabled by the integrated application UI unit 402, whereby the user becomes capable of confirming necessity or unnecessity of deletion and capable of setting the expiration date.

The delete confirmation box 702 is a check box for setting whether an icon delete notification should be displayed on the display unit 202 of the information processing apparatus 100 before the icon displayed on the touch panel of the image processing apparatus 101 is deleted. When the delete confirmation box 702 is checked, the integrated application UI unit 402 causes the display unit 202 of the information processing apparatus 100 to display an icon delete confirmation dialog, which will be described below.

The expiration date field 703 is used to specify an expiration date. When the date and time specified in the expiration date field 703 has elapsed, the SMB icon information unit 404 determines that the corresponding icon is allowed to be automatically deleted. In the expiration date field 703, a date and time after the current date and time can be set.

Figure 8:
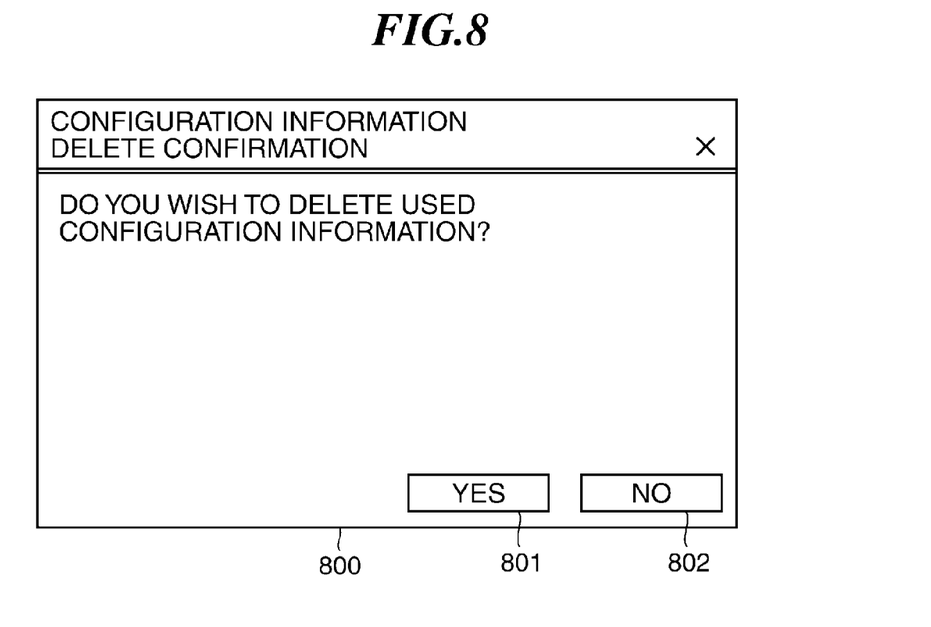
FIG. 8 is a view showing an example of configuration information delete confirmation dialog that is displayed when a delete confirmation box in the configuration information setup dialog is checked.

FIG. 8 shows an example of a configuration information delete confirmation dialog displayed on the display unit 202 of the information processing apparatus 100 when the delete confirmation box 702 is checked.

When the delete confirmation box 702 shown in FIG. 7 is checked by the user, the integrated application UI unit 402 causes the display unit 202 to display the configuration information delete confirmation dialog, which is denoted by reference numeral 800 in FIG. 8.

On the configuration information delete confirmation dialog 800, a message "Do you wish to delete the used configuration information?" is displayed, and a YES button 801 and a NO button 802 are displayed.

The YES button 801 is used to delete the corresponding icon. When the YES button 801 is pressed by the user, the SMB icon information unit 404 deletes the icon, if the auto-delete box 701 has been checked. On the other hand, when the NO button 802 is pressed by the user, the SMB icon information unit 404 does not delete the icon.

Figure 9:
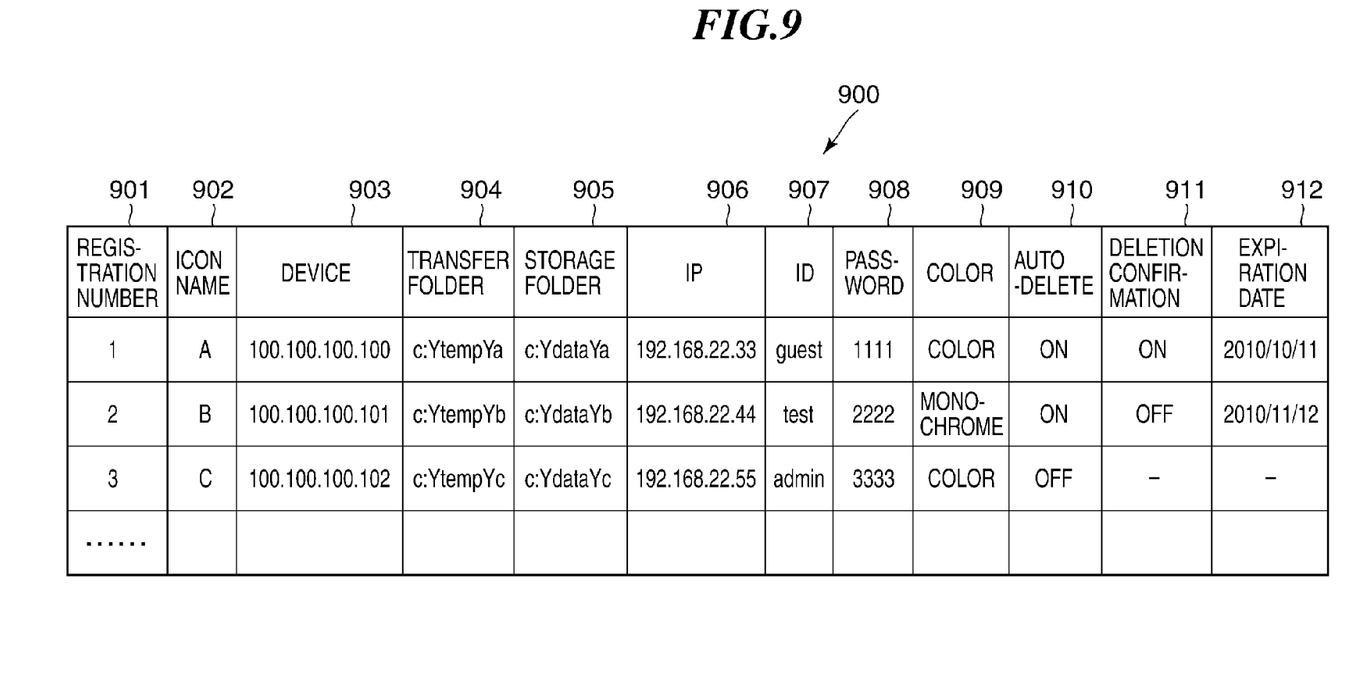
FIG. 9 is a view showing an example of a configuration information list held in the information processing apparatus.

FIG. 9 shows an example of a configuration information list held in, e.g., the hard disk 207 of the information processing apparatus 100.

The configuration information list 900 is stored with plural pieces of configuration information, which are respectively set by users on the configuration information setup dialog 600 of FIG. 6 and on the deletion condition setup dialog 700 of FIG. 7 and each of which includes a condition for deletion.

The configuration information list 900 has a plurality of rows respectively correspond to the pieces of configuration information. Each row includes a registration number field 901 set with a registration number that represents the order in which the corresponding configuration information is generated, an icon name field 902, a device field 903 set with an IP of image processing apparatus, a transfer folder field 904 set with a transfer folder (transfer destination), a storage folder field 905, an IP field 906 set with an IP of information processing apparatus, an ID field 907 set with an ID to be used to access the transfer folder, a password field 908 set with a password to be used to access the transfer folder, a color information field 909, an auto-delete filed 910 in which an auto-delete setting flag is set ON or OFF, a deletion confirmation field 911 in which a deletion confirmation flag is set ON or OFF, representing the necessity or unnecessity of confirmation before deletion of the confirmation information, and an expiration date field 912 set with the expiration date of the configuration information.

It should be noted that the configuration information list 900 can be transmitted from the information processing apparatus 100 to the image processing apparatus 101 and can be stored into the image processing apparatus 101.

Figure 10:
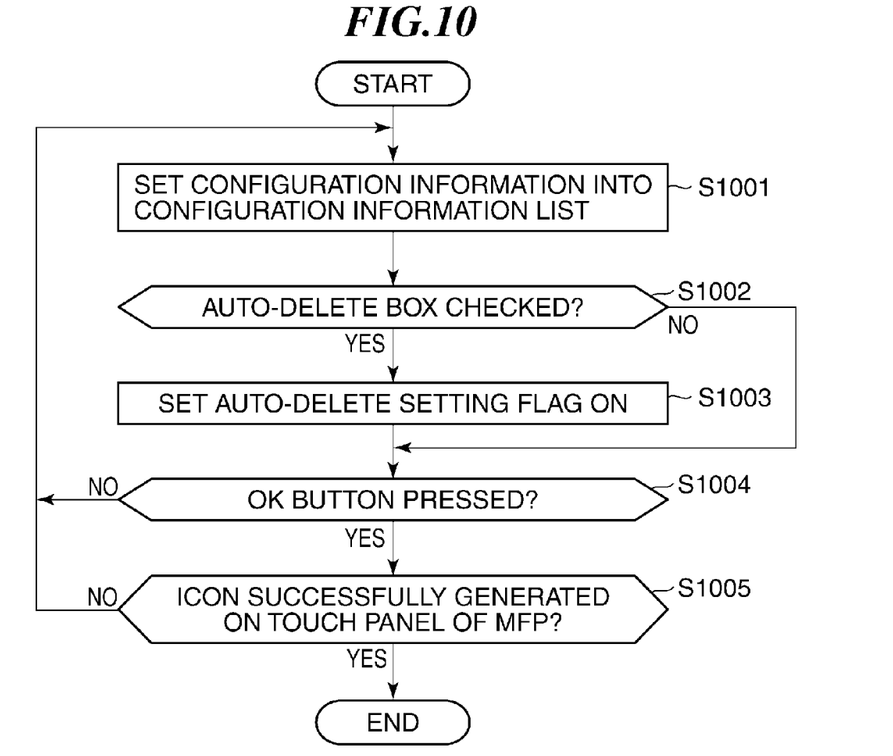
FIG. 10 is a flowchart showing procedures of an icon generation process performed by the integrated application.

FIG. 10 shows, in flowchart, procedures of an icon generation process performed by the integrated application previously described with reference to FIG. 4.

When an icon generation button (not shown) of the information processing apparatus 100 is pressed by the user, the integrated application 401 that operates on the CPU 201 of the information processing apparatus 100 starts the icon generation process.

The integrated application UI unit 402 causes the display unit 202 of the information processing apparatus 100 to display the configuration information setup dialog 600 shown in FIG. 6. When configuration information is input by the user through the configuration information setup dialog 600, the SMB icon information unit 404 (setting unit) sets the configuration information into the corresponding row of the configuration information list 900 (step S1001).

Next, the SMB icon information unit 404 confirms whether the auto-delete box 701 of the deletion condition setup dialog 700 of FIG. 7 has been checked (step S1002). If the auto-delete box 701 has been checked (i.e., if YES to step S1002), the SMB icon information unit 404 determines that use of the auto-delete function is allowed, and the process proceeds to step S1003. If the auto-delete box 701 has not been checked (i.e., if NO to step S1002), the SMB icon information unit 404 determines that use of the auto-delete function is not allowed, and the process proceeds to step S1004.

In step S1003, the SMB icon information unit 404 sets the auto-delete setting flag ON in the auto-delete field 910 of the corresponding row of the configuration information list 900.

In step S1004, the SMB icon information unit 404 determines whether the OK button 610 is pressed in the configuration information setup dialog 600, thereby determining whether an icon should be generated. When the OK button 610 is not pressed (i.e., if NO to step S1004), the process returns to step S1001.

When the OK button 610 is pressed (i.e., if YES to step S1004), the SMB icon information unit 404 (display instructing unit) instructs the image processing apparatus 101 to generate (display) an icon including the configuration information on the touch panel of the image processing apparatus 101, and determines whether the icon has successfully been generated on the touch panel (step S1005).

If it is determined that the generation of the icon has succeeded (i.e., if YES to step S1005), the present process is completed. On the other hand, if it is determined that the generation of the icon has failed (i.e., if NO to step S1005), the process returns to step S1001.

Figure 11:
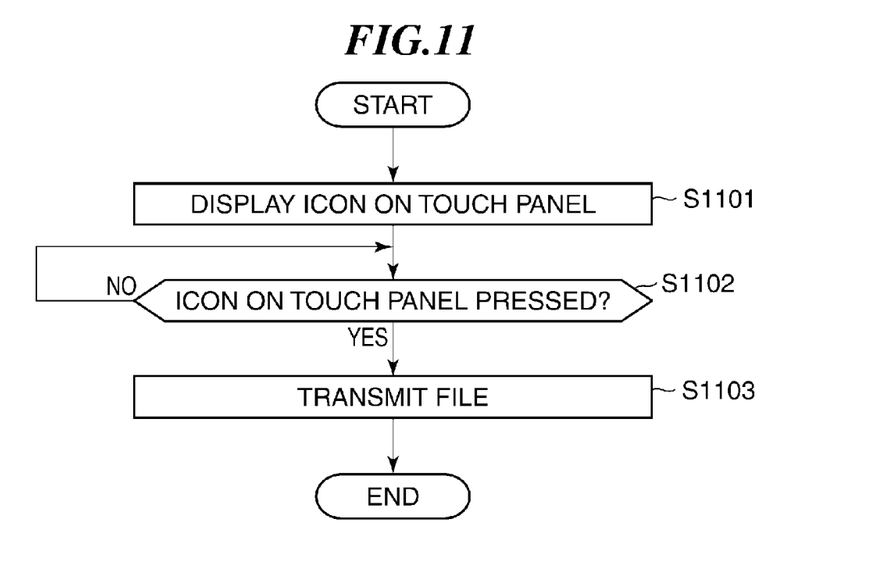
FIG. 11 is a flowchart showing procedures of a file transmission process performed by the image processing apparatus.

FIG. 11 shows, in flowchart, procedures of a file transmission process performed by the image processing apparatus 101.

In the file transmission process of FIG. 11, an icon is generated (displayed) on the touch panel of the image processing apparatus 101, as previously described in the icon generation process of FIG. 10 (step S1101). Next, the user interface 312 of the image processing apparatus 101 determines whether the icon on the touch panel is pressed (step S1102). If the answer to step S1102 is NO, the user interface 312 waits for the icon being pressed.

When the icon is pressed (i.e., if YES to step S1102), the user interface 312 notifies the main controller 308 to that effect. In response to the notification, the main controller 308 determines a transmission destination (transfer destination) of a file, while referring to the transfer folder 904 in the row (corresponding to the pressed icon) of the configuration information list 900, and transmits the file to the determined transmission destination, e.g., the information storage apparatus 102 (step S1103), whereupon the present process is completed.

Figure 12:
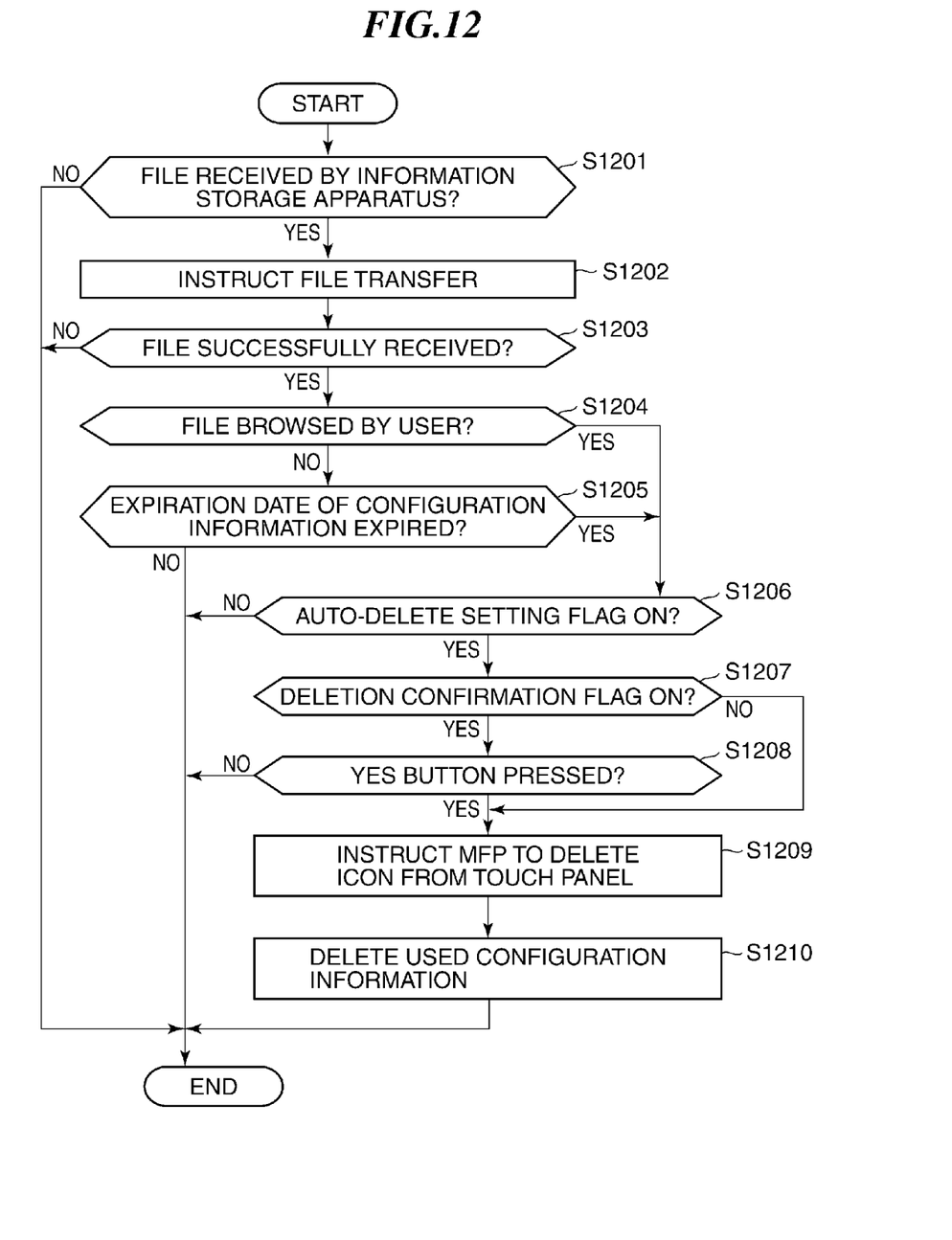
FIG. 12 is a flowchart showing procedures of a configuration information deletion process performed by the integrated application.

FIG. 12 shows, in flowchart, procedures of a configuration information deletion process performed by the integrated application 401 that operates on the information processing apparatus 100.

In the configuration information deletion process of FIG. 12, the library management unit 403 determines whether a file (image file or document file) from the image processing apparatus 101 is received by the information storage apparatus 102 (step S1201). When determining that no file is received by the information storage apparatus 102 (i.e., if NO to step S1201), the library management unit 403 completes the present process.

When determining that a file is received by the information storage apparatus 102 (i.e., if YES to step S1201), the library management unit 403 determines a file transfer destination, while referring to the transfer folder field 905 in the row (corresponding to the pressed icon) of the configuration information list 900, and instructs the information storage apparatus 102 to transfer the file to the transfer destination folder, e.g., a folder in the information processing apparatus 100 (step S1202).

Next, in step S1203, the library management unit 403 determines whether the file transmitted from the information storage apparatus 102 is successfully received at the transfer destination folder (more generally, at the transmission destination, e.g., at the information processing apparatus 100). When determining that the file is not successfully received (i.e., if NO to step S1203), the library management unit 403 completes the present process.

When the file is successfully received (i.e., if YES to step S1203), the library management unit 403 determines a storage folder, while referring to the storage folder field 905 of the configuration information list 900, and stores the received file into the storage folder, and the integrated application UI unit 402 determines whether the received file is browsed by the user (step S1204).

When determining that the file is not browsed by the user (i.e., if NO to step S1204), the integrated application UI unit 402 determines that the user has not confirmed the arrival of the file, and the SMB icon information unit 404 determines whether the expiration date of the configuration information has expired, while referring to the expiration date field 912 of the configuration information list 900 (step S1205). When determining that the expiration date has not expired (i.e., if NO to step S1205), the integrated application 401 (the SMB icon information unit 404 in this case) completes the present process.

If it is determined that the expiration date has expired (i.e., if YES to step S1205), the process proceeds to step S1206. If it is determined that the file is browsed by the user (i.e., if YES to step S1204), the integrated application UI unit 402 determines that the user has confirmed the arrival of the file, and the process proceeds to step S1206.

In step S1206, the SMB icon information unit 404 determines whether or not the auto-delete setting flag is at ON, while referring to the auto-delete field 910 of the configuration information list 900. If the auto-delete setting flag is not at ON or if the auto-delete setting flag cannot be acquired, the present process is completed. If the auto-delete setting flag is at ON (i.e., if YES to step S1206), the SMB icon information unit 404 determines that the icon and configuration information should be deleted after the icon is used, and determines whether or not the deletion confirmation flag is at ON, while referring to the deletion confirmation field 911 of the configuration information list 900 (step S1207). If the deletion confirmation flag is not at ON (i.e., if NO to step S1207), the process proceeds to step S1209.

If the deletion confirmation flag is at ON (i.e., if YES to step S1207), the SMB icon information unit 404 determines that a notification should be made to the user before the configuration information is deleted, and then confirms whether or not the YES button 801 is pressed in the configuration information delete confirmation dialog 800 (step S1208). If the YES button 801 is not pressed (i.e., if NO to step S1208), the present process is completed.

If the YES button 801 is pressed (i.e., if YES to step S1208), the SMB icon information unit 404 (deletion instructing unit) instructs the image processing apparatus 101 to delete from the touch panel the icon that is determined in step S1102 of the file transmission process of FIG. 11 as being pressed (step S1209). In response to the instruction, the main controller 308 of the image processing apparatus 101 deletes the icon from the touch panel.

Next, the SMB icon information unit 404 deletes the configuration information in the row (corresponding to the pressed icon) of the configuration information list 900 (step S1210), whereupon the present process is completed.

In the configuration information deletion process of FIG. 12, the fact that the expiration date of configuration information expires is used as the condition for deleting the configuration information, but this is not limitative. For example, it is possible to use as the configuration information delete condition the fact that the number of times of use of configuration information exceeds a predetermined limited number of times of use of the configuration information.

As described above, in this embodiment, whether or not configuration information should be allowed to be automatically deleted is determined based on the configuration information delete condition stored in the information processing apparatus or in the image processing apparatus. Accordingly, the user's intention can be taken into account in a case where configuration information is deleted upon occurrence of a situation that a file or other data cannot successfully be received by a transmission destination. Thus, it becomes easy for the user to register and delete the configuration information and user-friendliness can be improved. In addition, the confirmation setting indicating that a confirmation to the user is to be made prior to deletion of the configuration information can be established, so that a confirmation about necessity or unnecessity of deletion of the configuration information is made to the user, whereby the user becomes capable of easily confirming necessity or unnecessity of deletion of the configuration information.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-279278, filed Dec. 15, 2010, which is hereby incorporated by reference herein in its entirety.

What is claimed is:

1. An information processing apparatus capable of communicating with an image processing apparatus through a network, comprising:
    a setting unit configured to set configuration information used by the image processing apparatus for data transmission;
    a display instructing unit configured to instruct the image processing apparatus to display, on a display unit of the image processing apparatus, at least one mark corresponding to at least one piece of configuration information set by said setting unit;
    a selecting unit configured to select, based on a user instruction, a mark from the at least one mark displayed on the display unit;
    a determination unit configured to determine, after the mark is selected by said selecting unit, whether data has been already referred to by a user after the data has been transmitted from the image processing apparatus to a transmission destination that is indicated by the configuration information corresponding to the selected mark; and
    a deletion instructing unit configured to instruct the image processing apparatus to delete the configuration information corresponding to the selected mark if it is determined by said determination unit that the data has been already referred to by the user.

2. The information processing apparatus according to claim 1, wherein an expiration date of the configuration information is set, and
    said deletion instructing unit instructs the image processing apparatus to delete the configuration information corresponding to the selected mark in a case where the expiration date of the configuration information corresponding to the selected mark expires.

3. The information processing apparatus according to claim 2, further including:
    a confirmation setting receiving unit configured to receive a confirmation setting that indicates whether a confirmation to a user is to be made prior to deletion of the configuration information corresponding to the selected mark; and
    a deletion confirmation unit configured to make a deletion confirmation to the user about the configuration information corresponding to the selected mark in a case where the confirmation setting indicating that the confirmation is to be made has been received by said confirmation setting receiving unit,
    wherein said deletion instructing unit instructs the image processing apparatus to delete the configuration information corresponding to the selected mark in a case where the deletion confirmation to the user is made by said deletion confirmation unit.

4. The information processing apparatus according to claim 1, wherein a limited number of times of use of the configuration information is set, and
    said deletion instructing unit instructs the image processing apparatus to delete the configuration information corresponding to the selected mark in a case where a number of times of use of the configuration information corresponding to the selected mark exceeds the limited number of times of use.

5. The information processing apparatus according to claim 1, wherein in a case where the transmission destination indicated by the configuration information corresponding to the selected mark is the information processing apparatus, said deletion instructing unit instructs the image processing apparatus to delete the configuration information corresponding to the selected mark, if the data transmitted from the image processing apparatus has been referred to by a user.

6. An information processing apparatus according to claim 1, wherein the mark is an icon.

7. A control method for an information processing apparatus capable of communicating with an image processing apparatus through a network, comprising:
    a setting step of setting configuration information used by the image processing apparatus for data transmission;
    a display instructing step of instructing the image processing apparatus to display on a display unit of the image processing apparatus at least one mark corresponding to at least one piece of configuration information set in said setting step;
    a selecting step of selecting, based on a user instruction, a mark from the at least one mark displayed on the display unit;
    a determining step of determining, after the mark is selected in said selecting step, whether data has been already referred to by a user after the data has been transmitted from the image processing apparatus to a transmission destination that is indicated by the configuration information corresponding to the selected mark; and
    a deletion instructing step of instructing the image processing apparatus to delete the configuration information corresponding to the selected mark if it is determined in said determining step that the data has been already referred to by the user.

8. A non-transitory computer-readable storage medium storing a program for causing a computer to execute a control method for an information processing apparatus capable of communicating with an image processing apparatus through a network, the control method comprising:
    a setting step of setting configuration information used by the image processing apparatus for data transmission;
    a display instructing step of instructing the image processing apparatus to display on a display unit of the image processing apparatus at least one mark corresponding to at least one piece of configuration information set in said setting step; and
    a selecting step of selecting, based on a user instruction, a mark from the at least one mark displayed on the display unit;
    a determining step of determining, after the mark is selected in said selecting step, whether data has been already referred to by a user after the data has been transmitted from the image processing apparatus to a transmission destination that is indicated by the configuration information corresponding to the selected mark; and
    a deletion instructing step of instructing the image processing apparatus to delete the configuration information corresponding to the selected mark if it is determined in said determining step that the data has been already referred to by the user.

9. An image processing apparatus comprising:
    a storing unit configured to store a transmitting setting;

a transmitting unit configured to send image data to a transmission destination according to the transmitting setting stored in the storing unit; and a deletion unit configured to delete the transmitting setting used for transmitting of the image data by the transmitting unit if the image data transmitted by the transmitting unit has been referred to by a user after the image data was received at the transmission destination.

10. The image processing apparatus according to claim 9, further comprising a receiving unit configured to receive the transmitting setting from an information processing apparatus via a network, wherein the storing unit stores the transmitting setting received by the receiving unit.

11. The image processing apparatus according to claim 10, wherein the transmitting setting includes information indicating a folder of the transmission destination.

12. The image processing apparatus according to claim 9, wherein the transmitting setting includes a transmission destination of image data.

* * * * *